March 12, 1929.    R. HOLLIS    1,705,251

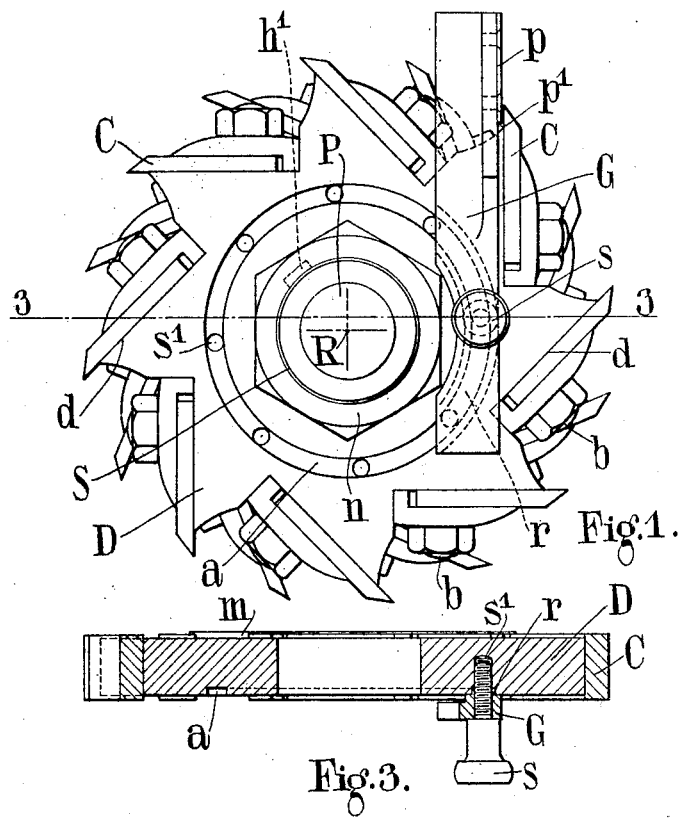
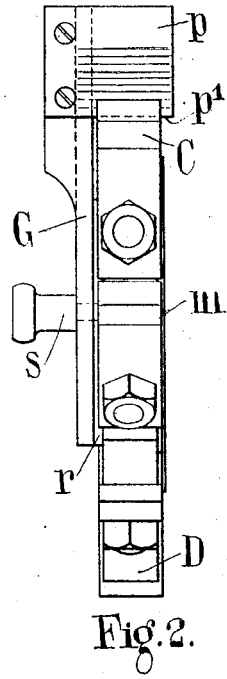
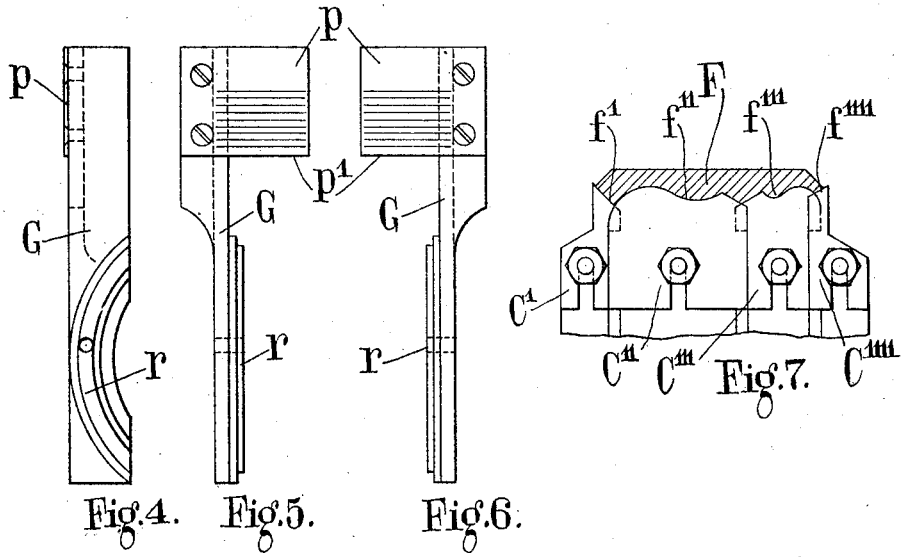
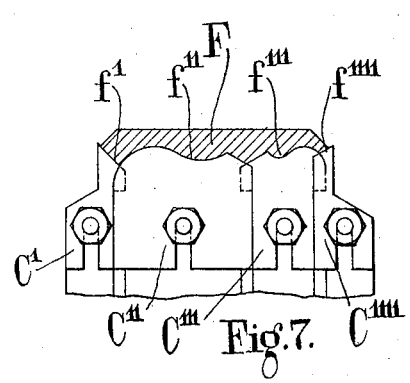

HIGH SPEED CUTTER BLOCK FOR WOODWORKING AND LIKE MACHINES

Filed Nov. 2, 1926    2 Sheets-Sheet 2

Inventor:
Robert Hollis
BY
ATTORNEYS

Patented Mar. 12, 1929.

1,705,251

UNITED STATES PATENT OFFICE.

ROBERT HOLLIS, OF WANSTEAD, ENGLAND, ASSIGNOR TO HOLLIS HIGH SPEED CUTTER BLOCK LTD., OF LONDON, ENGLAND.

HIGH-SPEED CUTTER BLOCK FOR WOODWORKING AND LIKE MACHINES.

Application filed November 2, 1926, Serial No. 145,754, and in Great Britain May 28, 1926.

This invention relates to cutter blocks such as are in use with wood working machinery and more particularly to the class of cutter blocks which is designed for the production of moulding of various forms. Such cutter blocks in modern wood working machinery are carried on spindles which are driven at a high speed such that it is not practically convenient to increase, and one object of this invention is to increase the output of such machinery without increasing the speed of the spindles carrying the cutter blocks nor reducing the finish of the work produced.

Another object of this invention is the making of such cutter blocks more easily adaptable to the production of various forms of moulding, and a still further object of this invention is to provide a means for accurately setting the cutting tools in proper relation in the cutter block.

In carrying this invention into effect I construct a series of discs adapted to fit closely one against another and I form holes in their centre and thread them upon a sleeve having at each end an adjustable lock nut, so that by tightening up such nuts the series of discs may be clamped rigidly together to form one complete cutter block.

With such an arrangement of discs I am enabled to use a considerable number of cutting tools and have found six to eight tools in one disc to work efficiently, all the tools in one disc being adapted to deal with one element of the moulding pattern to be produced.

Such discs with multiple cutting edges produce a number of cutting impacts on the work per revolution in proportion to the number of cutting tools carried by each disc so that by this multiplicity of cutting impacts, I secure an increased fineness of finish to the work, and a greatly increased rate of output.

In most cases I set my discs on the sleeve in such relationship that the cutting tools of one disc are slightly behind those of the next earlier disc of the series and slightly in front of those of the next later disc of the series, and when convenient I make the tools of such a width that the cutting area swept by one or both cutting edges of the disc overlaps the cutting area swept by one or both the cutting edges on the preceding disc in order by this means to obtain a perfect finish at the points where one element of the pattern joins another.

I make each disc of my improved cutter block separate and independent from the other and complete in itself, so that I may build up any desired cutter block comprising any number of discs with their cutters, the discs being placed in any desired order of sequence one to another.

It will be understood that the efficiency of tool carrying discs of this character depends on the accuracy with which all the cutting edges on each disc can be set relatively to the centre of rotation and this essential requirement I achieve by forming annular grooves in the sides of the discs and concentric with the discs and constructing gauge arms having projections adapted to take into the said annular grooves by means of which the gauge arms may move round the disc so that their gauge faces may sweep across the cutting edges of the tools set in the discs and I thus secure an accurate means of setting the cutting tools in correct relation to the centre of rotation of the discs.

My invention may be more clearly understood by reference to the accompanying sheet of drawings in which:—

Fig. 1 is a side view of my compound cutter block with gauge arm in place.

Fig. 2 is an edge view of one disc of my cutter block with gauge arm in place.

Fig. 3 is a section of one disc on the line 3, 3, Fig. 1.

Figs. 4, 5 and 6 are detail views of a gauge arm.

Fig. 7 is a diagrammatic view of the cutting edges of my compound cutter block superimposed one upon another.

Referring now to Figs. 1, 2, 3 and 8, I construct discs such as illustrated at D. and having around their peripheries flat surfaces d. d. set at a convenient angle with the tangent to the circle at those points and provided with holes b. b. or other convenient means which may secure the cutters C. in their places on the discs. I form any convenient number of flat surfaces on my discs to take a corresponding number of cutters and I make all the cutters on one disc of identical form and suitable for dealing with one element only of the moulding or pattern to be produced.

I form in the flat sides of each disc an annular groove a. concentric with the disc and I construct a gauge arm G. having on its side a curved projection r. struck from the same centre as the annular groove in the discs and adapted to take into these grooves and to move freely therein around the centre of rotation R. of the disc in such a manner that each point on the gauge arm maintains an unvarying relation to the said centre of rotation.

I fix upon the outer end of this gauge arm a gauge plate p. against the edges p'. of which each cutting edge in turn may be accurately set in relation to the centre of rotation. If desired the face of the gauge plate may be graduated as shown and the tools may be set to these graduation lines.

I attach the gauge arm to the disc by a screw pin s. which takes into screwed holes s'. s'. set at convenient points on the face of the disc such that the gauge arm when thus fixed is in position to gauge one or other of the cutting tools. It will be obvious that I may use many different methods of clamping the gauge arm in the desired position for use but the screw pin as above described is the method I have found most convenient and reliable.

Figure 9:
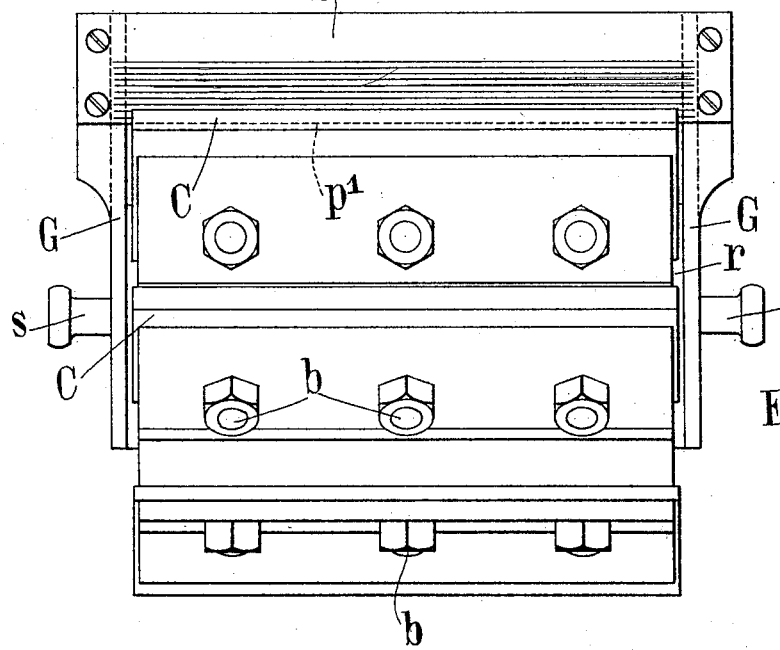
Fig. 9 shows a double gauge arm in position on a cylinder cutter block.

I construct tool arms adapted to fit on to either side of my disc and when using a long cutter block, especially such as are known in the art as cylinder cutter blocks, I set a gauge arm on each end as shown in Fig. 9, and in such case I use a long gauge plate, as shown, which may be fixed upon both gauge arms and thus extend right across the cutter block.

I make my disc of any convenient thickness and I separate the periphery of one disc from that of another when necessary by thin washers or by a set off m.

Figure 8:
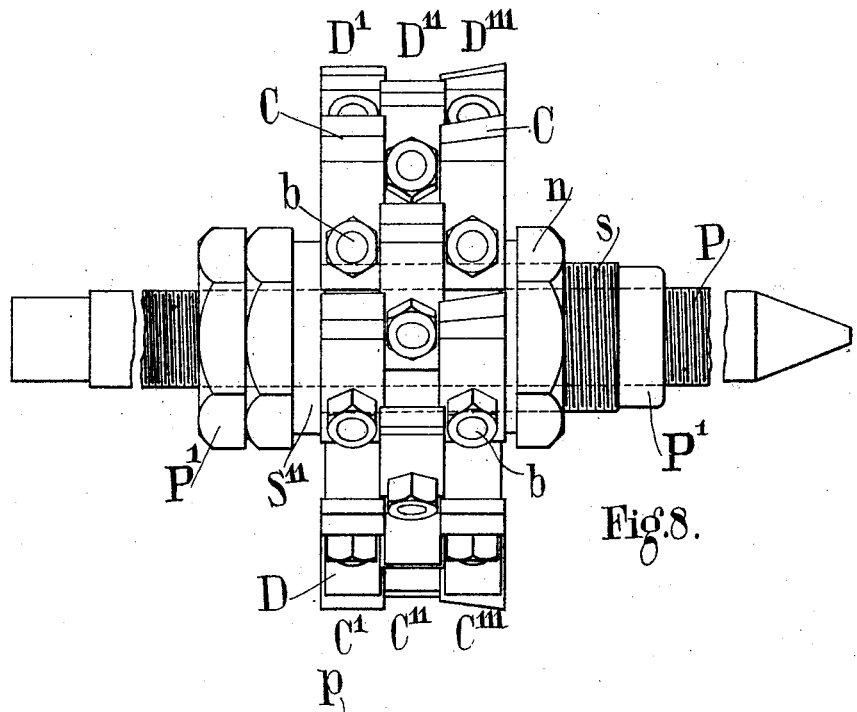
Fig. 8 is a front view of my compound cutter block.

I form a hole in the centre of my disc and a keyway or keyways h'. and I thread any desired number of such discs on to a sleeve S. as shown in Figs. 1 and 8, which sleeve carries a feather over which the keyways of the disc may slide. I form a collar S''. on one end of the sleeve S. and a screw thread with nut n. on the opposite end and by this means I fix the discs rigidly on the sleeve.

I form a screw thread on the inner surface of my sleeve which engages with a threaded spindle P. and I adjust the position of the sleeve on the spindle by lock nuts P'. By these means I construct a compound cutter block as shown in Figs. 1 and 8, having any convenient number of discs D'. D''. D'''. and so forth, each disc carrying a series of cutters C'. C''. C'''. and so forth, each series of cutters being adapted to deal with one element of the moulding or pattern to be formed.

I arrange my discs in relation one to another in such a manner that the cutters dealing with one element of the pattern do not in general form an impact with the work at the same instant as the cutters dealing with another element of the pattern.

This method may be understood by referring to Figs. 1 and 8, and the diagrammatic Fig. 7. Thus in Fig. 8, the series of cutters C'''. is represented in the drawing as lying immediately behind the series C'. while the series C''. is intermediate behind these two series. It will be seen therefore that the series C'. and C'''. make impact with the work at the same moment while the series C''. make impact with the work at a different moment. Fig. 7, shows the necessity and advantage of this arrangement. Here F. represents a moulding to be produced and C'. C''. C'''. represents the edges of a series of cutters shown diagrammatically as superimposed one upon another. Each of these series of cutters deals with one element of the moulding to be produced. Thus the cutters C'. deal with the element f. of the moulding F.; C''. with f''. and C'''' with f'''.

It will now be seen that by arranging my cutters so that the series C''. make impact with the work at a moment different from C'. and C''. I am enabled to make each series of cutters overlap the area swept by the adjoining series of cutters. Thus C''' overlaps f'' while C''. overlaps f'. and f''' and so on. By this system of overlapping of the cutters I am enabled to take a clean sweep of the work and avoid the inaccuracies which are involved when the path of one cutter ends at the point where the path of the next begins.

I adjust the relationship of one series of cutters to another by means of the position of the keyway h'. in the disc and I may form more than one keyway in each disc so that either one may be used as may be desirable for adjusting the relation of one disc to the next in order.

I do not limit this invention to any given number of discs or series of cutters nor to any particular form of design but I have found that with this invention herein described I am able to produce the finest work at a speed quite unknown heretofore and without any increase of revolutions per minute of the cutter block spindle beyond that in common practice.

What I claim is:—

1. A device of the character described, comprising in combination, a disc adapted to support a plurality of tools disposed tangentially of the disc, said disc being provided in one face thereof with an annular concentric depression and a plurality of threaded perforations, one for each of said tools, a tool setter provided at one side thereof with an arc-shaped projection adapted to fit said recess, and a set screw carried by said setter for engagement with the perforations of the disc, the organization being such that when the set screw is in engagement with either of said perforations the setter is in parallel relation to one of said cutters.

2. A device of the character described, comprising in combination, a disc adapted to support a plurality of tools disposed tangentially of the disc, said disc being provided in one face thereof with an annular concentric depression, a tool setter provided at one side thereof with an arc-shaped projection adapted to fit said recess, and means for securing the setter to the disc at predetermined points in said depression.

In testimony whereof I have signed my name to this specification.

ROBERT HOLLIS.